Figure 1:
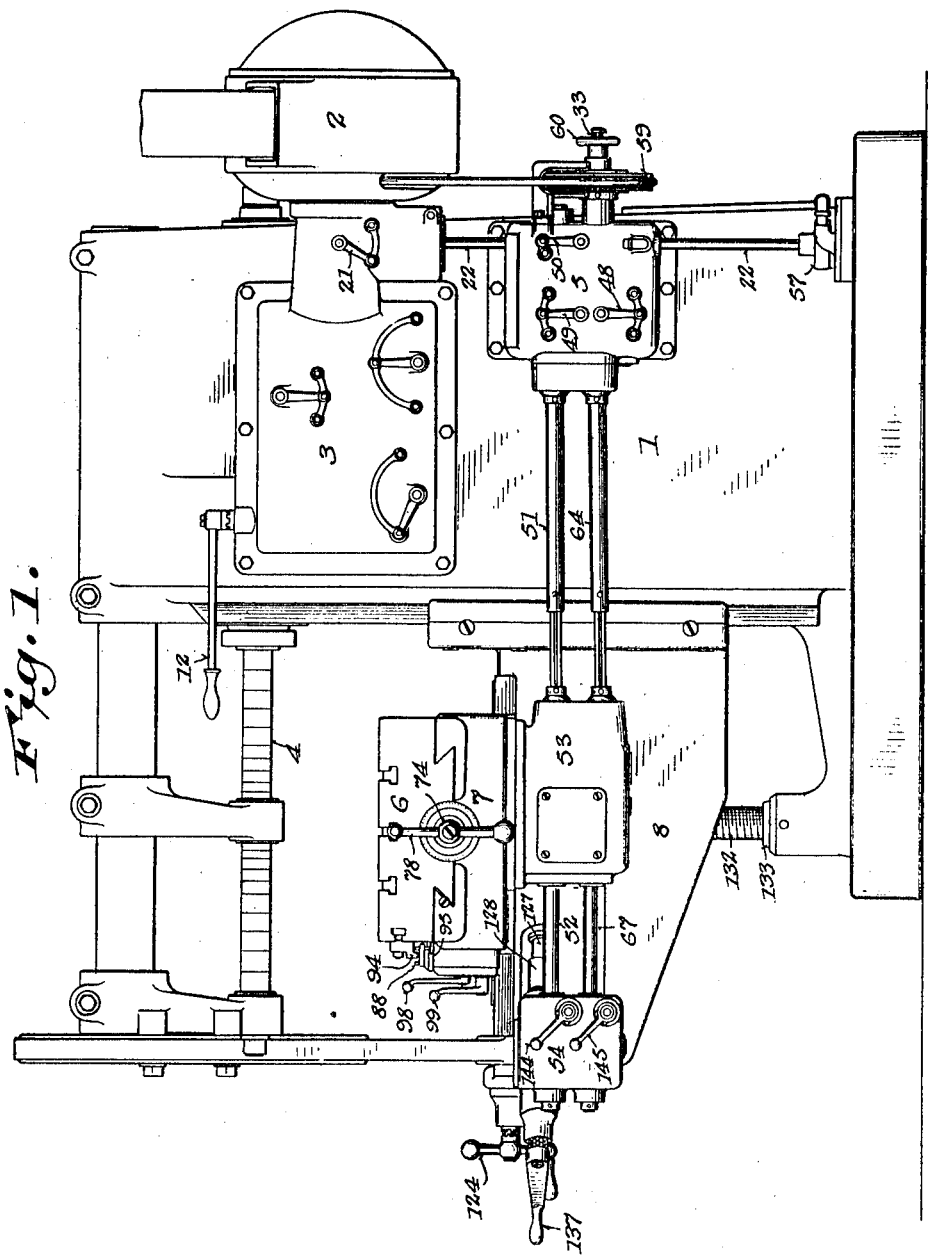

F. A. PARSONS.
TRANSMISSION MECHANISM FOR MACHINE TOOLS.
APPLICATION FILED SEPT. 29, 1917.

1,270,862.

Patented July 2, 1918.

9 SHEETS—SHEET 4.

Inventor:
Fred A. Parsons,
By Bottum Bottum Hudnall Mecher
Attorneys.

F. A. PARSONS.
TRANSMISSION MECHANISM FOR MACHINE TOOLS.
APPLICATION FILED SEPT. 29, 1917.

1,270,862.

Patented July 2, 1918.
9 SHEETS—SHEET 6.

Inventor:
Fred A. Parsons,
By Bolton Bolton Hudnall Wheeler
Attorneys.

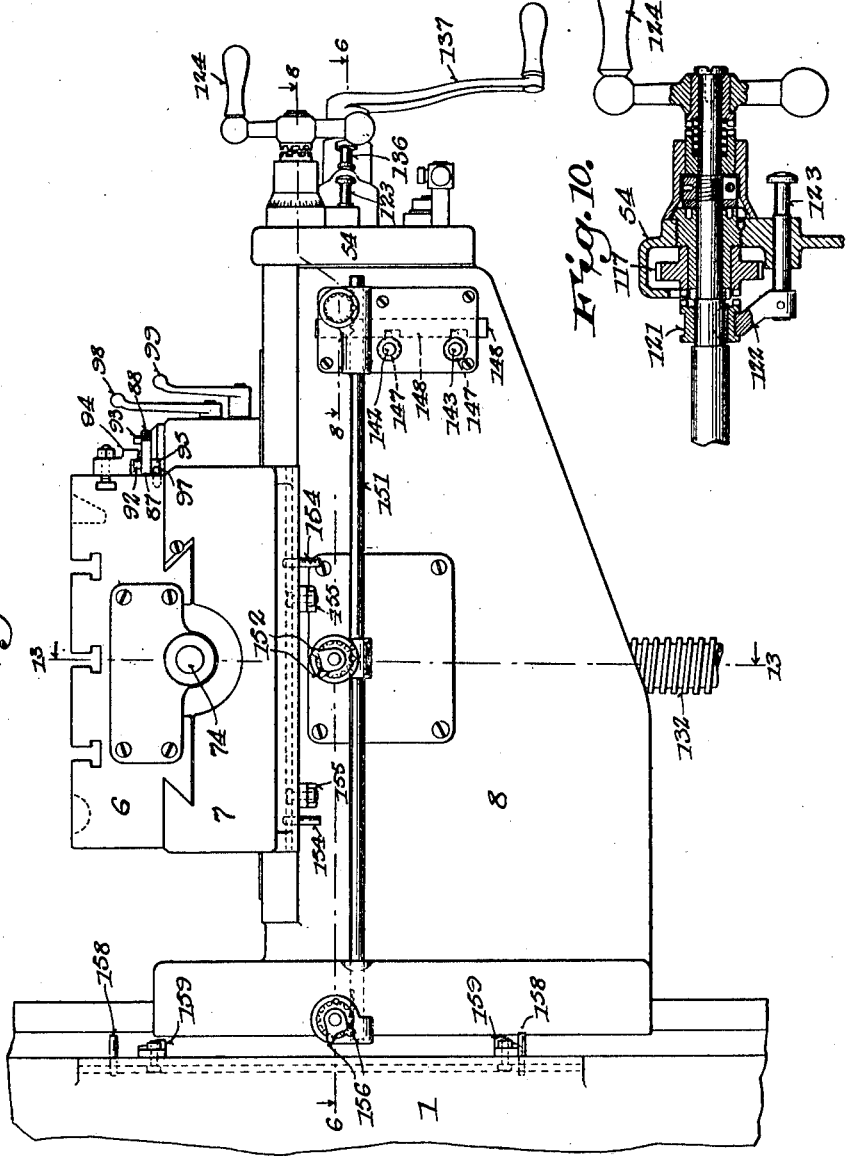

F. A. PARSONS.
TRANSMISSION MECHANISM FOR MACHINE TOOLS.
APPLICATION FILED SEPT. 29, 1917.
1,270,862.
Patented July 2, 1918.
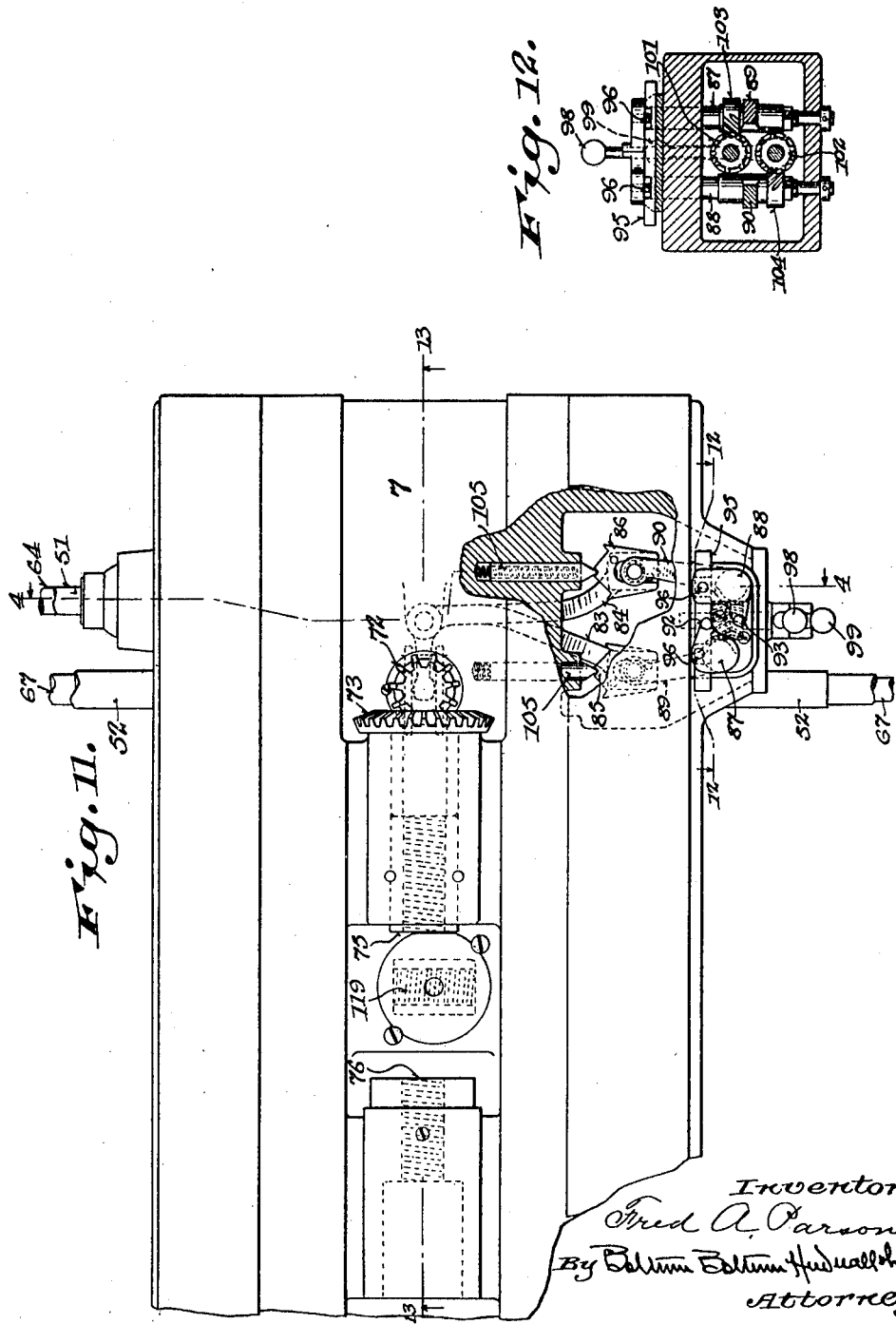

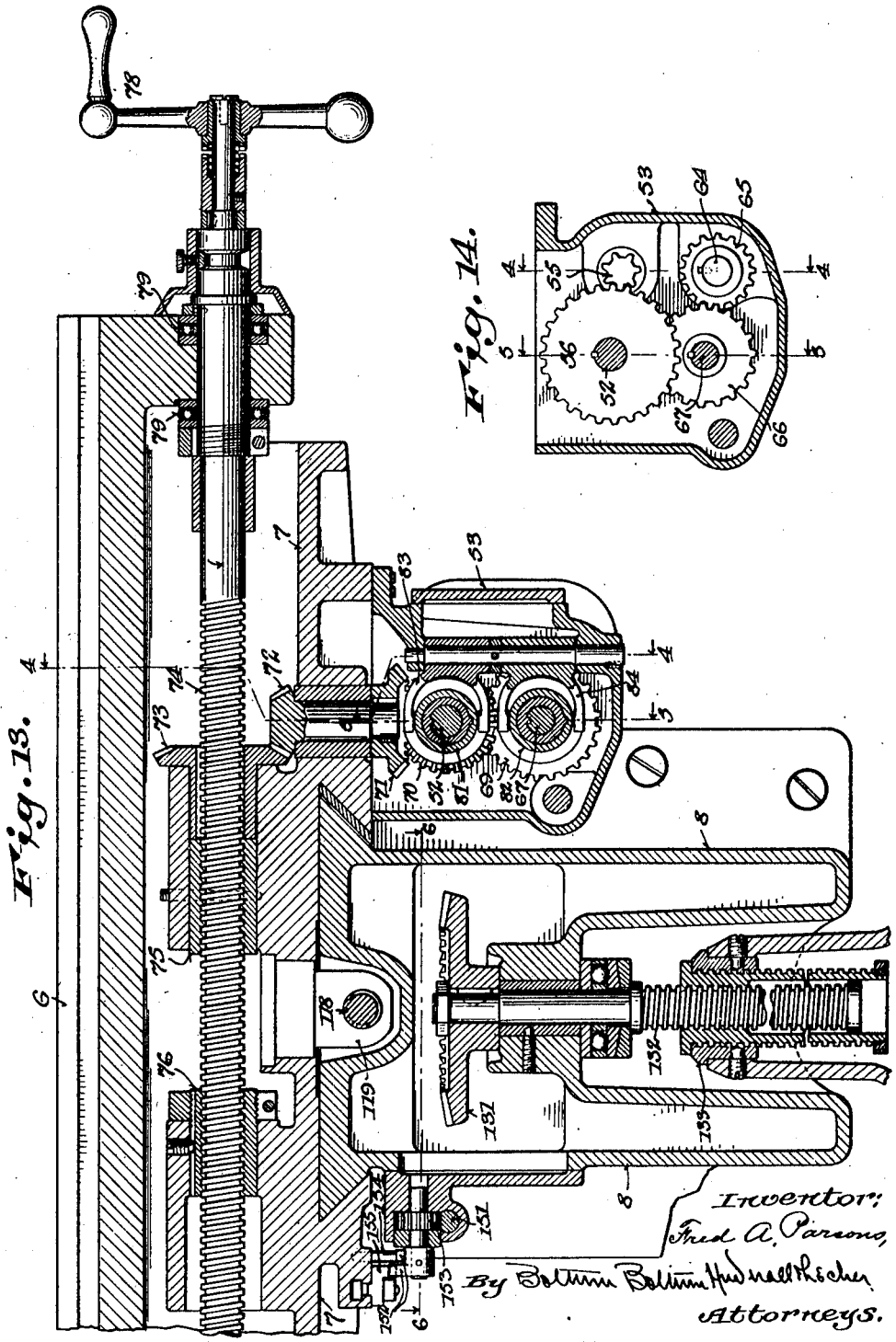

UNITED STATES PATENT OFFICE.

FRED A. PARSONS, OF MILWAUKEE, WISCONSIN, ASSIGNOR TO THE KEMPSMITH MANUFACTURING CO., OF WEST ALLIS, WISCONSIN, A CORPORATION OF WISCONSIN.

TRANSMISSION MECHANISM FOR MACHINE-TOOLS.

1,270,862.     Specification of Letters Patent.     Patented July 2, 1918.

Application filed September 29, 1917. Serial No. 194,020.

*To all whom it may concern:*

Be it known that I, FRED A. PARSONS, a citizen of the United States, residing at Milwaukee, in the county of Milwaukee and State of Wisconsin, have invented certain new and useful Improvements in Transmission Mechanism for Machine-Tools, of which the following is a specification, reference being had to the accompanying drawing, forming a part thereof.

This invention relates more particularly to machine tools, such as milling machines in which either the work or the tool supporting members are movable back and forth in one or more, usually three, courses or paths transverse to one another.

The main objects of the invention are to render a variable feed transmission and a quick traverse transmission separately or jointly available, according to varying conditions and requirements; to provide for manual and complete or partial automatic control of the movements effected by each transmission; to enable the operator to readily and unmistakably select the desired transmission and by the simple movement of a handle to determine and effect the movement of the member actuated by such transmission in a corresponding direction; to limit the torque to which either transmission can be subjected in imparting movement to the member actuated thereby; to provide for relatively slow variable feed movements, and for relatively rapid constant quick-traverse movements in each of several courses or paths transverse to one another, the feed movements being at the same rates in all the courses or paths and the quick traverse movements at different rates in different courses or paths; to provide separate and independent controlling means for the course or path of travel in which the reciprocatory supporting member is most used and joint controlling means for the other less used courses or paths of travel; and generally to simplify and improve the construction and operation of mechanism of this class.

The invention consists in the construction, arrangement and combination of parts as hereinafter particularly described and pointed out in the claims.

In the accompanying drawing like characters designate the same parts in the several figures.

Figure 2:
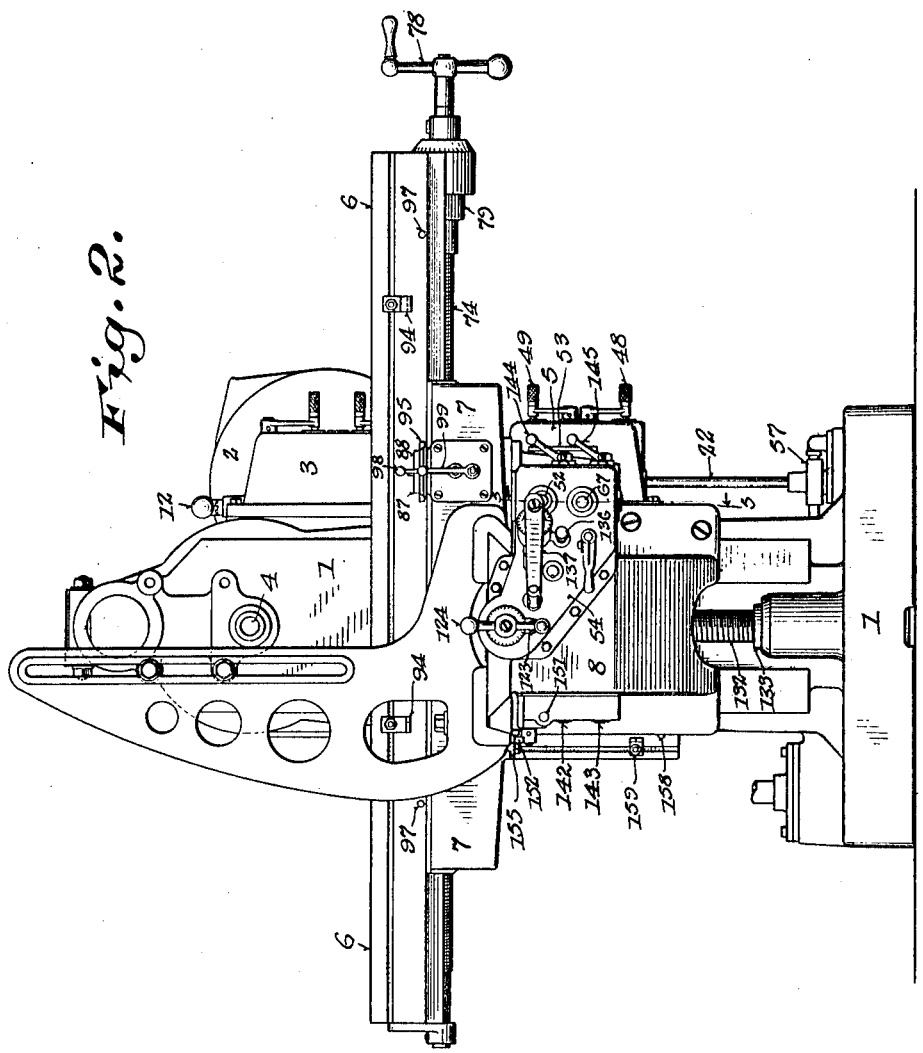
Figure 3:
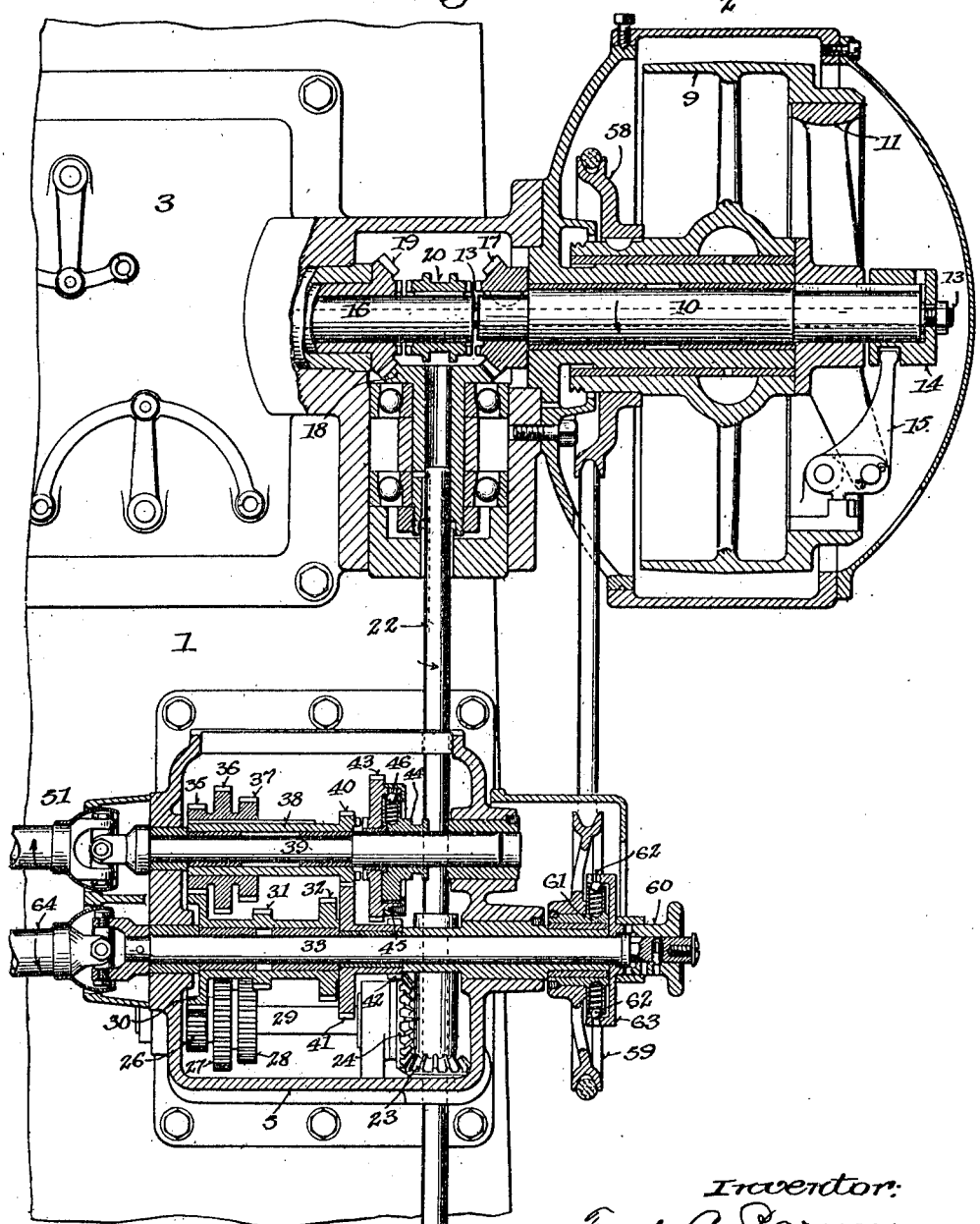
Figure 4:
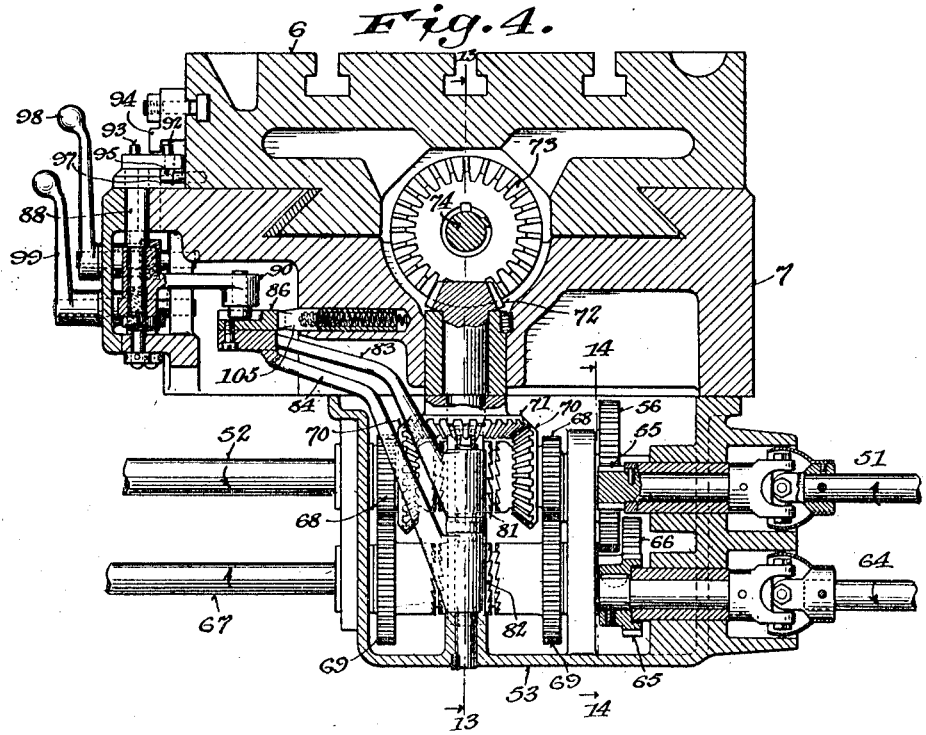
Figure 5:
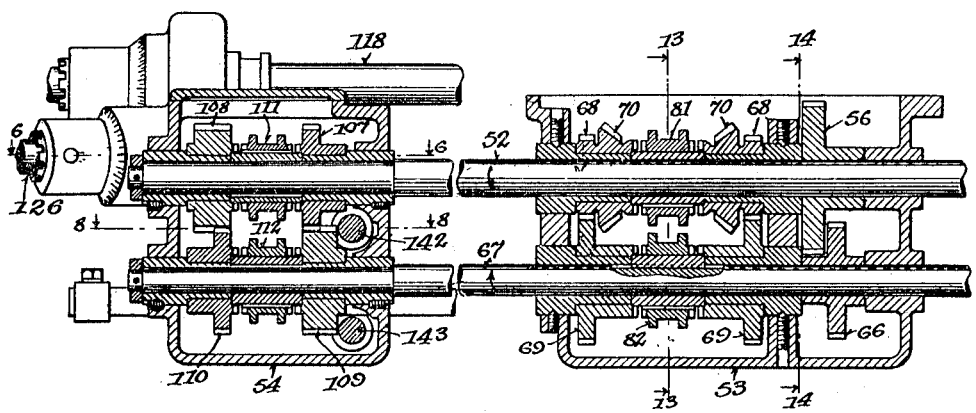
Figure 6:
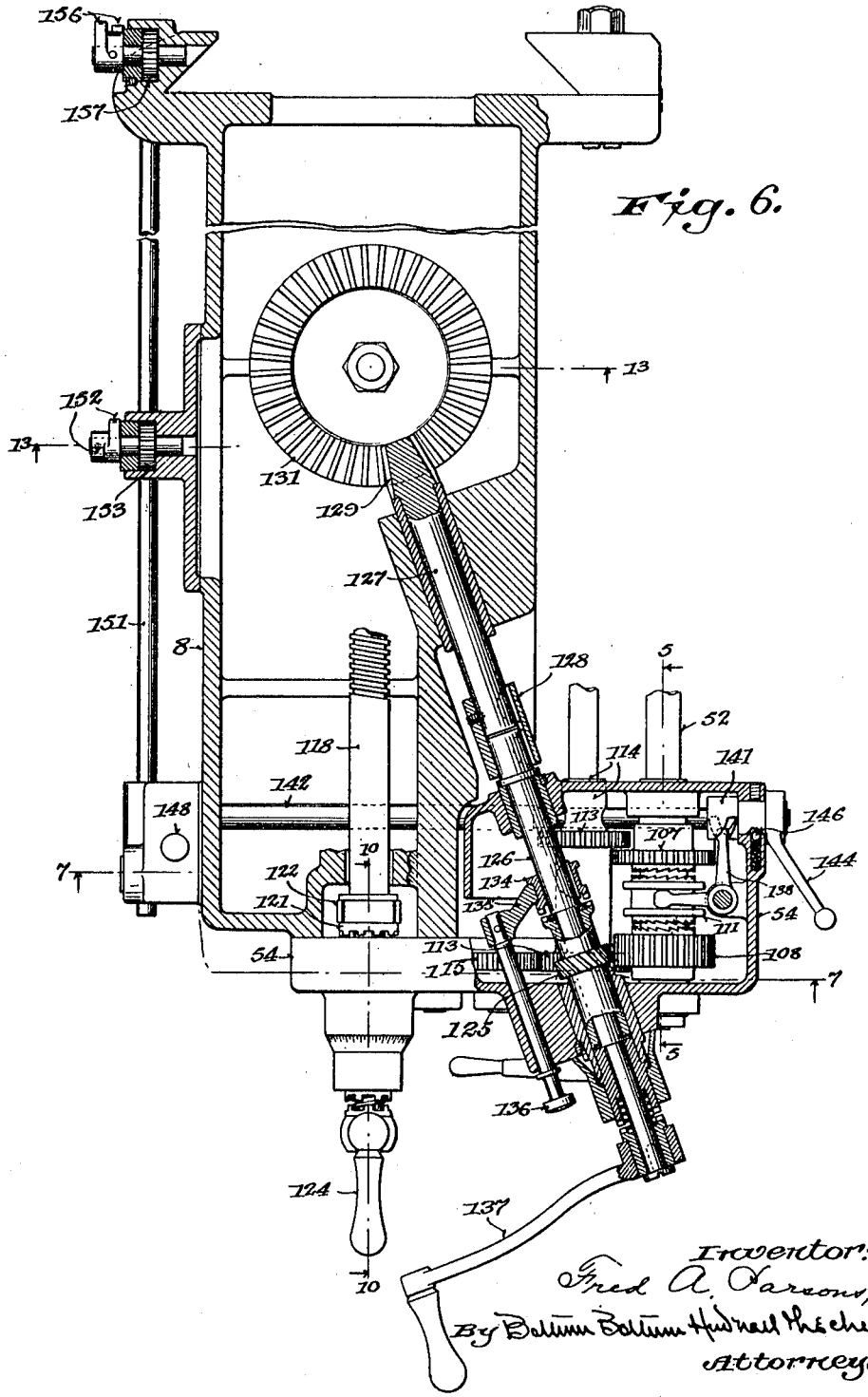
Figure 7:
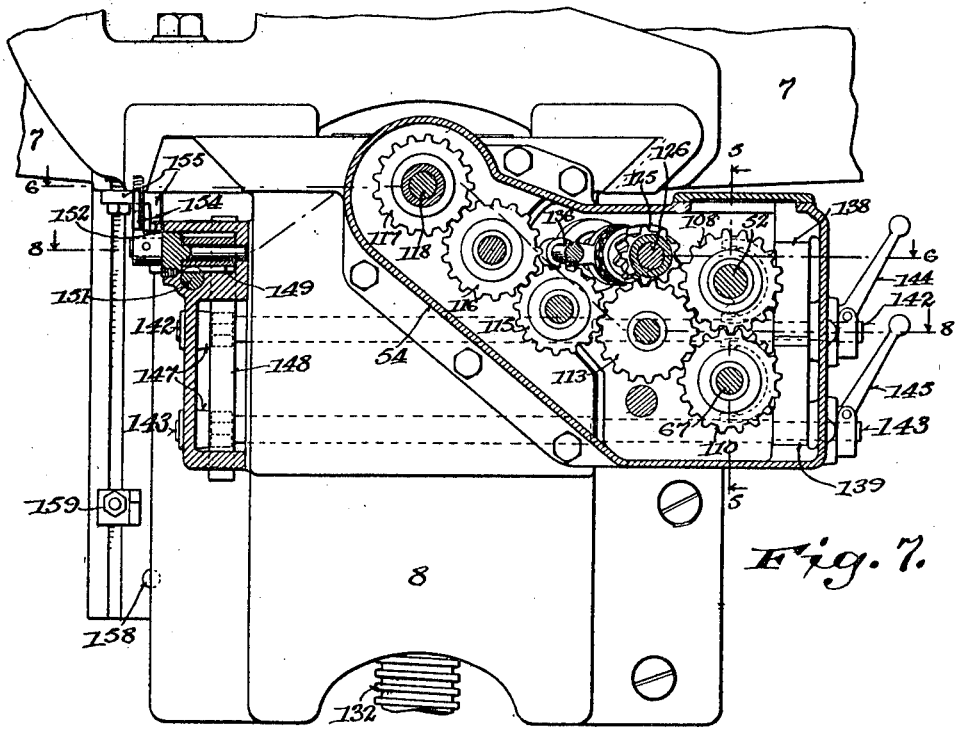
Figure 8:
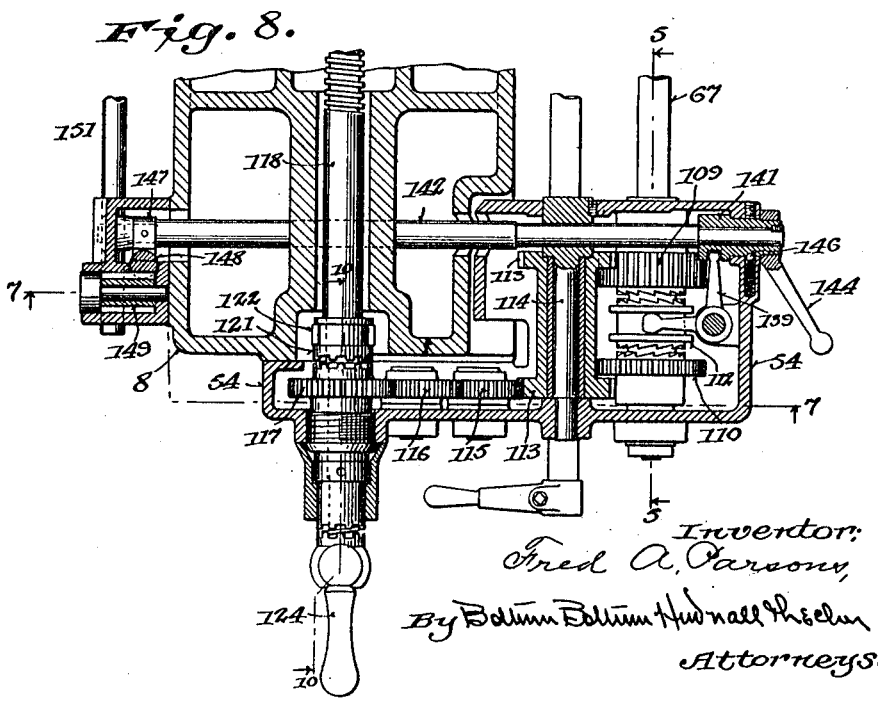

Figure 1 is a side elevation as viewed from the right relative to Fig. 2, of a milling machine embodying the invention; Fig. 2 is a front elevation of the machine; Fig. 3 is an enlarged vertical section of the main driving member and associated portions of the spindle drive and of the feed and quick traverse transmissions; Fig. 4 is a vertical cross section on the line 4—4, Figs. 11, 13 and 14, of the table, showing the feed and quick traverse connections therewith and controlling devices; Fig. 5 is a vertical section on the line 5—5, Figs. 2, 6, 7, 8, 13 and 14, of portions of the feed and quick traverse transmissions and branch transmissions for operating the table, saddle and knee therefrom; Fig. 6 is a horizontal section on the line 6—6, Figs. 5, 7, 9 and 13, of the knee and its feed and quick traverse connections; Fig. 7 is a vertical section on the line 7—7, Figs. 6 and 8, of a portion of the branch and sub-branch transmissions for operating the knee and saddle; Fig. 8 is a horizontal section on the line 8—8, Figs. 5 and 9; Fig. 9 is a side elevation of the knee as viewed from the left relative to Figs. 2, 6 and 7; Fig. 10 is a sectional detail on the line 10—10, Figs. 6 and 8, of a portion of the sub-transmission for operating the saddle; Fig. 11 is a plan view of the saddle showing portions of the branch transmission for operating the table and clutch shifting and controlling devices; Fig. 12 is a vertical section on the line 12—12, Fig. 11; Fig. 13 is an enlarged longitudinal section of the table and cross section of the saddle and knee on the line 13—13, Figs. 4, 5, 6, 9 and 11, showing the branch transmission for imparting longitudinal movement to the table and portions of sub-branch transmissions for the cross movement of the saddle and vertical movement of the knee; and Fig. 14 is a vertical cross section on the line 14—14, Figs. 4 and 5, of the distributing feed and quick traverse shafts and associated gears carried by the saddle.

Referring to Figs. 1 and 2, the machine herein shown and described as equipped with transmission mechanism embodying the invention, comprises a box frame or column 1, on which are mounted a housing or case 2, for the main driving pulley or member, a box or case 3, containing a part of the change-speed transmission gearing through which the tool arbor or spindle 4 is rotated from said main driving member, and a box or case 5, containing change-speed gearing in the feed transmission for the table.

The machine is provided with a reciprocatory table or work supporting member 6, which is mounted below the arbor or spindle 4 on a saddle or member 7, and movable horizontally in a course or path transverse to the arbor or spindle. The saddle or member 7 is mounted on a vertically movable knee 8 and movable parallel with the tool arbor or spindle 4, the knee being supported and guided by vertical ways on the frame or column 1, all according to the well known practice in machines of this class.

Spindle drive or transmission.

The tool arbor or spindle 4 is driven and the table 6 is fed and traversed horizontally in two courses or paths transverse to each other, one crosswise of said arbor or spindle, and the other lengthwise thereof, and in a third vertical course or path perpendicular or transverse to the other two courses or paths, by a common driving member such as a pulley 9, mounted on a bearing in the housing or case 2, as shown in Fig. 3, coaxially with a shaft 10 with which it is operatively connected at will by an expansible friction clutch 11 keyed on said shaft. The clutch 11 is expanded and engaged with a friction rim on the pulley 9 by means of a hand lever 12 mounted on the gear box or case 3, as shown in Figs. 1 and 2, and connected with the clutch, as partially shown in Fig. 3, by a rod 13, passing axially through the shaft 10, a collar 14 and a lever 15, or by any other suitable means.

As shown in Fig. 3, the shaft 10 is connected with a coaxial shaft 16 of the spindle transmission indirectly by intermeshing bevel gears 17, 18 and 19, and directly by a clutch 20 feathered on the shaft 16 and shiftable into engagement with either of the gears 17 and 19 which are mounted on the shafts 10 and 16 respectively. The clutch 20 is shifted by a reversing lever 21 shown in Fig. 1.

Feed transmission.

As shown in Fig. 3, a vertical shaft 22, keyed or feathered at its upper end in the hub of the gear 18 and always rotated in the same direction and at a constant speed when the pulley 9 is connected by the clutch 11 with the shaft 10, drives change-speed gearing in the box 5, through bevel gears 23 and 24. This change-speed gearing may be constructed and arranged to produce any desired number of speed variations. As shown in Fig. 3, it comprises a set of three shiftable gears 26, 27 and 28, on the shaft 29 of the bevel gear 24, three non-shiftable gears 30, 31 and 32, fixed on a sleeve supported on a horizontal shaft 33, parallel with the shaft 29, and a set of three shiftable gears 35, 36 and 37, keyed or feathered on a sleeve 38, which is loosely mounted on a primary feed transmission shaft 39, parallel with the shaft 33, and is formed or provided at one end with a gear 40 in constant mesh with a gear 41, loosely mounted on the shaft 33. The gear 41 is attached to a smaller coaxial gear 42, adapted to mesh with a shiftable gear 43, mounted on the shaft 39 and connected therewith by a torque limiting device or yieldable coupling. The gear 40 or the sleeve 38 is formed or provided with clutch teeth, with which similar clutch teeth on the gear 43 may be engaged, to transmit motion from said sleeve directly to the shaft 39.

The torque limiting device, as shown, comprises two main members, a hub or sleeve 44, keyed or feathered on the shaft 39 and formed with radial sockets, and an annular rim or flange 45, which may be formed on or attached to the gear 43, surrounding said hub or sleeve and formed with holes or pockets, which are spaced to correspond with the sockets in the hub or sleeve, and with which outwardly spring-pressed balls 46, confined in said sockets, are normally held in yielding engagement. The gears 26, 27 and 28 are shifted on the shaft 29, and the gears 35, 36 and 37 are shifted on the sleeve 38, to carry any one of them into engagement with one of the gears 30, 31 and 32, by hand levers 48 and 49, mounted on the box 5, as shown in Figs. 1 and 2, and the gear 43 is shifted with the torque limiting device on the shaft 39, to carry it into and out of engagement with the gear 42, or to engage or disengage the clutch teeth on the gear 40 or sleeve 38 by a hand lever 50 also mounted on the box 5. With this change-speed gearing, by proper manipulation of the levers 48, 49 and 50, eighteen speed-changes of the shaft 39 are obtained.

From the primary variable speed feed shaft 39, shown in Fig. 3, motion is transmitted by a universally jointed and telescopic shaft 51, to a secondary feed and distributing shaft 52, supported by bearings in a gear box 53 attached to and movable with the saddle 7, and a gear box 54, attached to and movable with the knee 8, as shown in Figs. 1, 2, 4 and 5.

As shown in Figs. 4 and 14, the shaft 51 is connected with the shaft 52 by reducing gears 55 and 56, the smaller gear 55 being fixed on a section of the jointed shaft 51, having a bearing in the box 53 parallel with the shaft 52, and the larger gear 56 being splined or feathered on and shiftable lengthwise with the box 53 on the shaft 52.

While it is possible to break the spindle transmission by shifting the reversing clutch 20 to its neutral position, or to break the feed transmission by setting any of the shiftable speed-change gears in a neutral position, these neutral positions are merely incidental to changing from one driving condition to another, and ordinarily the clutch 11 controls both transmissions, so that when either the tool arbor 4 or the distributing feed shaft 52 is at rest or rotated, the other will be at rest or rotated also.

The vertical shaft 22 may be extended downwardly and utilized to drive an oil pump 57, as shown in Figs. 1 and 2.

Quick traverse transmission.

A grooved pulley 58 is fixed on the hub of the main driving pulley 9, and is connected by a round belt with a grooved pulley 59, which is mounted on the gear box 5, coaxially with the primary quick traverse shaft 33, and is operatively connected therewith by a torque limiting device or yieldable coupling like or similar to that in the feed transmission as hereinbefore described, and by a manually operated clutch 60. The torque limiting device in this case comprises two main members, a hub or sleeve 61, which may be formed with or attached to the pulley 59 and is provided with outwardly spring-pressed balls 62, confined in radial sockets therein, and a member 63, provided with an annular flange overhanging the sockets in the other member and formed at corresponding intervals with radial holes or pockets with which the balls 62 are normally held in yielding engagement. The member 63 is formed with teeth coöperating with the clutch 60 to connect the pulley 59 through the medium of the torque limiting device with the shaft 33.

Except when the machine is to stand idle for a considerable length of time, the pulley 59 is operatively connected by the clutch 60 with the shaft 33, and the clutch will be assumed to be in its normal engaged position, in describing or referring to the operation of the transmission mechanism.

The shaft 33, which is utilized to support some of the change-speed gears of the associated feed transmission, but has no effect on the functions of such transmission, is connected, as shown in Figs. 1, 3, 4 and 14, by a universally jointed telescopic shaft 64 and reducing gears 65 and 66, with a secondary or distributing quick traverse shaft 67, supported in bearings in the gear boxes 53 and 54, parallel with the shaft 52. The gear 65 is fixed on a short section of the jointed shaft 64, having a bearing in the gear box 53 parallel with the shaft 67, and the gear 66 is keyed or feathered on said shaft and is slidable with the gear box lengthwise thereof.

It will be seen that the shaft 67 is thus rotated at a constant speed in a direction opposite to that of the shaft 52 from the main driving pulley 9, independently of the clutch, 11, so that the quick traverse transmission is available for shifting the position of the table 6 when the tool arbor or spindle transmission and the feed transmission are at rest.

Longitudinal table feed and quick traverse mechanism and control.

As shown in Figs. 4, 5 and 13, two driving gears 68 are mounted coaxially with the shaft 52 in the box 53, in mesh with two driving gears 69 correspondingly mounted in said box with relation to the shaft 67. Formed with or attached to the gears 68 are a pair of bevel gears 70, which mesh with opposite sides of an intermediate bevel gear 71, on a short vertical shaft having a bearing in the saddle 7 and provided at its upper end with a bevel gear or pinion 72. The gear or pinion 72 meshes with a bevel gear 73 having a bearing on the saddle and splined or feathered on a screw 74, which engages with nuts 75 and 76 on the saddle and is rotatably mounted in the ends of the table 6, in the usual or any suitable manner. The screw is provided at its front end with a crank 78 for manually shifting the table.

The nut 76 is adjustable axially toward and from the nut 75 to take up wear and lost motion. The screw is held against longitudinal movement relative to the table by ball thrust bearings 79, shown in Fig. 13.

Either of the gears 68 may be operatively connected with the shaft 52 by a clutch sleeve 81 splined or feathered on said shaft and formed at the ends with teeth constituting two driving elements which are shiftable into and out of engagement with corresponding teeth on the hubs of said gears, or of the bevel gears 70 attached thereto. In like manner either of the gears 69 may be operatively connected with the shaft 67 by a clutch sleeve 82, splined or feathered on said shaft and formed at the ends with teeth constituting two driving elements shiftable into engagement with corresponding teeth on the hubs of said gears. Relatively slow variable longitudinal feed movement is thus imparted to the table 6 from the shaft 52 through the reversing gears 70 and 71 in either direction, according to which of the gears 68 is engaged by the clutch sleeve 81, at the desired rate of speed, depending on the adjustment of the change-speed gearing contained in the box 5, shown in Fig. 3; and in like manner, a relatively rapid quick traverse movement is imparted to the table from the shaft 67 in either direction, according to which of the gears 69 is engaged by the clutch sleeve 82, at a constant speed, depending on the speed of said shaft and the ratio of the intermeshing gears 68 and 69.

The clutches 81 and 82, constituting the feed and quick traverse driving elements for imparting longitudinal movement to the table, are shifted by the following mechanism, shown in Figs. 4, 11, 12 and 13:

Two angular forked levers 83 and 84, fulcrumed on a vertical post in the gear box 53, engage grooves in said clutch sleeves and are provided at their upwardly and forwardly projecting ends within a recess formed in the saddle 7, with cams 85 and 86. Two vertical oscillatory posts or stems 87 and 88, mounted on the front side of the saddle, have arms 89 and 90, provided with rollers or pins engaging slots in the cams 85 and 86. The posts or stems 87 and 88 are provided at their upper ends with eccentrically disposed pins 92 and 93 adapted to coöperate with trips or dogs 94, which are removably and adjustably mounted on the front side of the table 6, as shown in Figs. 1, 2, 4 and 9, for automatically shifting the clutches at any desired points in the travel of the table.

As shown in Figs. 2, 4, 11 and 12, a connecting bar or slide 95, mounted on and movable lengthwise of the saddle underneath the overhanging heads of the posts 87 and 88, is formed with transverse slots to receive pins 96, depending from said heads, the slots being wider than the diameter of the pins by an amount equal to the movement of either pin when it is turned with the post to which it is attached to shift the associated clutch from a neutral position into engagement with either of the associated driving gears.

The table 6 is provided on the front side, as shown in Figs. 1, 2, 4 and 9, with stop pins 97 in line with the slide 95, and adapted by engagement therewith to operate either shifting device and to shift either clutch sleeve 81 or 82 out of engagement with either of the associated driving gears, and thereby automatically arrest the movement of the table at the limits of its travel.

Hand levers 98 and 99, connected with the posts or stems 87 and 88, as shown in Figs. 4, 11 and 12, by spiral gears 101 and 102 fixed on the pivot stems of the levers and meshing with similar spiral gears 103 and 104 on the respective posts 87 and 88, afford convenient means for manually shifting the clutches 81 and 82, a feed connection or a quick traverse connection with the table being determined by the selection of the proper lever and the direction of movement of the table being indicated or determined by the direction of the movement of the lever handle. A single movement of either lever handle from its neutral position to the right or left, causes movement of the table in the same direction.

With the clutch operating and controlling devices thus described, it will be seen that the clutches 81 or 82 may be shifted either manually by the levers 98 and 99, or automatically by properly shaped and positioned trips or dogs 94 on the table 6, from a neutral position into engagement with either of the driving gears 68 or with either of the driving gears 69, without moving the other clutch from its neutral position, and that after either clutch has been so shifted manually or automatically into engagement with either of the associated driving gears, it will be automatically shifted back to its neutral position by the engagement of one of the stop pins 97 with the slide 95, thereby arresting the movement of the table at the limit of its travel in either direction.

The slide 95 having lost motion connections with the posts 87 and 88 as hereinbefore described, while it permits either clutch to be shifted either manually or automatically from a neutral into an engaged position and vice versa independently of the other clutch and permits both clutches to be shifted into engagement with feed and quick traverse driving gears 68 and 69 operating to move the table in the same direction, will not permit the clutches to be engaged at the same time with feed and quick traverse driving gears operating to move the table in opposite directions.

Spring actuated detents or plungers 105, guided and held in sockets in the saddle 7, as shown in Fig. 11, coöperate with the cams 85 and 86 to yieldingly hold each of the clutches 81 and 82 in neutral position or in either engaged position, the three low points of each cam corresponding with such three positions of the associated clutch.

The ends of the forks of levers 83 and 84, as shown in Fig. 11, are slightly narrower than the grooves in the clutch sleeves 81 and 82, with which they engage, thus allowing lost motion between the clutches and the clutch shifting mechanism. This lost motion is less than the corresponding movement of either cam from its middle or neutral low point to the high point on either side thereof, so that when either high point, which would coincide with the position of initial or final engagement of the clutch teeth but for such lost motion, passes the point of the associated plunger 105 in either direction, the action of the plunger on the inclined faces of the cam will tend to force the clutch into full engagement with either gear or into its neutral position out of contact with both gears. Thus if the clutch is being shifted from engaged to neutral position, the cam will not permit it to dwell in contact with either gear, which would result in noise and wear, and if it is being shifted from neutral to engaged position, it will not permit it to dwell in a position of partial engagement, in which the teeth of the two clutch elements might drag over and injure one another.

With properly shaped and adjusted trips or dogs 94, either clutch may be automatically shifted by the movement of the table at any point or points in its traverse to operatively connect or disconnect the table with either the feed shaft 52 or the quick traverse shaft 67, with the exception hereinbefore mentioned, that the two clutches cannot be engaged at the same time with a feed gear 68 and a quick traverse gear 69 for moving the table in opposite directions. For example, to automatically change from a feed to a quick traverse movement, or from a quick traverse to a feed movement of the table at any point between the limits of its travel, trips or dogs 94 are mounted and adjusted on the table at the proper points to first shift either the quick traverse or the feed clutch into engagement with the proper driving gear, and then shift the other clutch out of engagement with the driving gear through which the table is being moved, thereby operatively connecting the table temporarily with both the feed and quick traverse transmission shifts. Otherwise, the table would be disconnected from both transmissions and its movement would be arrested, so that it would be necessary to start it again by hand. It is partly for this reason that a torque limiting device is introduced into one or each of the transmissions, so that when both are operatively connected with the table in making the change by means of trips or dogs from one transmission to the other, the tendency of one transmission to actuate the table at a different rate from the other will not break or injure the mechanism.

*Cross and vertical feed and quick transmission mechanism and control.*

Cross feed and quick traverse movements of which the table partakes in a horizontal course or path parallel with the tool arbor or spindle 4 and transverse to the longitudinal movements of the table, are imparted to the saddle 7, and vertical feed and quick traverse movements of which both the table and the saddle partake in a course or path perpendicular or transverse to both the horizontal courses or paths or the longitudinal and cross movements of the table, are imparted to the saddle and knee by a branch and sub-branch transmissions taken off from the secondary or distributing feed and quick traverse shafts 52 and 67, which are carried by and movable vertically with the knee.

As shown in Figs. 5, 6, 7 and 8, two driving gears 107 and 108, are mounted concentrically with the feed shaft 52 in the box 54. In like manner, two driving gears 109 and 110 are mounted in said box concentrically with the quick traverse shaft 67 in mesh with the gears 107 and 108 respectively. Either of the gears 107 and 108 may be operatively connected with the shaft 52 by a clutch sleeve 111, splined or feathered thereon and formed or provided at the ends with clutch teeth constituting two driving elements and adapted to engage with clutch teeth on said gears. In like manner, either of the driving gears 109 and 110 may be operatively connected with the quick traverse shaft 67 by a clutch sleeve 112, splined or feathered thereon and formed or provided at the ends with clutch teeth constituting two driving elements and adapted to engage with corresponding teeth on the gears. Each of these clutch sleeves or clutches is shiftable into a middle or neutral position, as shown in Figs. 5, 6 and 8, out of engagement with both of the associated driving gears.

Two axially connected reversing gears 113, are mounted loosely on a stud 114, parallel with the shafts 52 and 67, and mesh one with the feed gear 108, and the other with the quick traverse gear 109, the gear 108 operating as an idler when the quick traverse gear 110 acts as a driver, and the gear 109 operating as an idler when the feed gear 107 acts as a driver. The two sub-branch transmissions are taken off from one of the reversing gears 113 for the cross feed and quick traverse and for the vertical feed and quick traverse, the reversing mechanism being common to both sub-branch transmissions.

The front gear 113 meshes with the first of a train of gears 115, 116 and 117, the last of which is loosely mounted in the box 54 concentrically with a cross feed and traverse screw 118, carried by the knee 8 and engaging a nut 119 (shown in Figs. 11 and 13) on the saddle 7. A clutch 121, splined or feathered on the screw 18, is manually shifted by a fork 122 and rod 123, shown in Fig. 10, into and out of engagement with clutch teeth on the gear 117 to connect and disconnect said gear and screw, and thus make or break the connection through the reversing gears with the feed driving gears 107 and 108 and the quick traverse driving gears 109 and 110.

The screw 118 is provided at its front end with a hand crank 124, loosely mounted thereon and operatively connected therewith by clutch members attached one to the screw and the other to the crank, and engaged with each other by pressing the crank toward the knee against the tension of an interposed spring.

The front reversing gear 113 also meshes with a spiral gear 125, loosely mounted on a shaft 126, having bearings in the gear box 54 obliquely to the shafts 52 and 67 and in alinement with a shaft 127 having a bearing in and supported by the knee, as shown in Fig. 6. The shaft 127, which is connected with the shaft 126 by a coupling 128, is provided at its rear end with a bevel gear or pinion 129, meshing with a bevel gear 131 fixed to the upper end of one member of a vertical telescopic screw 132 having a bearing in the knee 8 and engaging a nut 133 attached to the base of the frame 1, as shown in Fig. 13.

The shaft 126 is operatively connected with the gear 125 by a clutch 134, splined or feathered on the shaft and shifted by means of a fork 135 and a rod 136 into and out of engagement with clutch teeth on the hub of said gear. A hand crank 137 loosely mounted on the front end of the shaft 126 and provided with a clutch member engageable with a clutch member fixed on the shaft by pressing the crank toward the knee against the tension of an interposed spring, affords means for manually operating the screw 132 and moving the knee with the saddle and table mounted thereon vertically.

The clutches 111 and 112 are manually or automatically shifted by means of the following mechanism:

Angular forked levers 138 and 139, shown in Figs. 6 and 8, engaging annular grooves in the clutch sleeves, have lateral arms with rounded ends engaging spiral grooves in collars or sleeves 141 fixed on rocker shafts 142 and 143, passing horizontally and transversely through the knee 8. The collars or sleeves 141 extend outwardly through the box 54 and are provided at their outer ends with hand levers 144 and 145. Spring actuated balls or detents 146, confined in sockets in the wall of the gear box 54 and engaging properly spaced pockets or seats in the collars or sleeves 141, yieldingly hold the clutches 111 and 112 in their middle or neutral positions, and in engagement with either of the driving gears 107 and 108, or 109 and 110. The hand levers 144 and 145 are so connected with the clutches 111 and 112 that the movement of either lever from its neutral position in one direction or the other, corresponds with or indicates the direction of the resulting horizontal cross or vertical movement of the saddle or knee, and consequently of the table, which partakes of such movement, according to whether the screw 118 or the screw 132 is operatively connected by the clutch 122 or 135, through one of the sub-branch transmissions with one of the driving gears 107, 108, 109 and 110.

As shown in Figs. 6, 7, 8 and 9, the rocker shafts 142 and 143 are provided at the ends opposite the levers 144 and 145 with members 147, having radial or lateral teeth or lugs on one side, projecting into transverse slots in a vertically sliding connecting bar 148. The slots in the bar 148 are wider than the teeth or lugs on the members 147, and provide for lost motion in the connection between the rocker shafts 142 and 143, which permits either of the clutches 111 and 112 to be shifted from its neutral position into engagement with either of the associated driving gears and back to its neutral position, without affecting the other clutch in its neutral position, but prevents engagement of either clutch with either of the associated driving gears when the other clutch is engaged with a driving gear which would produce movement of the saddle or knee and consequently of the table, in the opposite direction.

For automatically shifting the clutches, the vertically sliding bar 148 is connected, as shown in Figs. 7 and 8, by a wide faced pinion 149 with a horizontal rack bar 151, slidably mounted on the knee 8.

As shown in Figs. 6 and 9, the horizontal movements of the saddle 7 on the knee 8 and hence the cross traverse of the table 6, are controlled by the following devices:

Teeth or lugs 152 are formed in different vertical planes at an angle to each other on a collar, which is fixed on the spindle of a pinion 153 meshing with teeth on the rack bar 151. The saddle is provided with fixed stop pins or projections 154, adapted by engagement with the teeth or lugs 152 in their paths, to shift either of the clutches 111 and 112 away from either of the associated driving gears with which it may be engaged, and thus arrest the movement of the saddle at the limit of its travel in either direction. The saddle is also provided with trips or dogs 155, removably and adjustably mounted thereon and adapted to coöperate with the teeth or lugs 152 to arrest the movement of the saddle at any desired intermediate points within the limits of its travel. In like manner the vertical movements of the knee 8 and hence of the saddle 7 and table 6 mounted thereon, are automatically controlled by teeth or lugs 156, formed in different vertical planes at an angle to each other on a collar which is fixed on the spindle of a pinion 157 meshing with teeth on the rack bar 151, and by stop pins or projections 158, fixed on the frame 1 in the paths of the teeth or lugs 156, and adapted by engagement therewith to arrest the vertical movement of the knee at the limits of its travel in either direction.

The frame is also provided with trips or dogs 159, removably and adjustably mounted thereon in the paths of the teeth or lugs 156 and adapted by engagement therewith to arrest the movement of the knee at any desired intermediate points within the limits of its travel.

From the foregoing description in connection with the drawing, the operation of the transmission mechanism and of the controlling devices will be apparent.

It will be seen also that relatively slow and variable speed feed movements and relatively rapid constant speed quick traverse movements of the table in three courses, longitudinal, cross and vertical, which are all subject to manual control and may be automatically controlled to a greater or less extent as desired, are provided for; that the variable feed and quick traverse transmissions are separately or jointly available for longitudinal movements of the table; that the longitudinal movements of the table in a horizontal course or path transverse to the tool arbor or spindle, the course or path most used, are controlled by means separate from and independent of the means for controlling the less used cross and vertical movements of the table in its other two courses or paths; that the operator is enabled to readily determine between feed and quick traverse movements by the selection of one of two associated hand levers, and to determine the direction of movement of the table in any of its three courses by the direction of movement of the selected hand lever, from a middle or neutral position, thus avoiding confusion, mistakes and accidents; that from a main quick traverse transmission and a common main driving member or connection for all transmissions, relatively rapid or quick traverse movements are imported through branch and sub-branch transmissions to the table at a constant rate of speed for each course or path, but at different rates for different courses or paths, without modifying or affecting the relatively slow variable feed movements of the table which are, as it is essential they should be, the same for all of the several courses or paths; and that all these various movements of the table are obtained and are manually or automatically controlled by mechanism of comparatively simple construction and operation.

Various changes in the construction and arrangement of parts may be made in the adaptation of the mechanism to machine tools of different designs and for different purposes, without departure from the principle and scope of the invention as defined in the following claims.

I claim:

1. In transmission mechanism for machine tools the combination with a reciprocatory member, two feed elements adapted respectively to impart relatively slow forward and backward movement to said member, two quick traverse elements adapted respectively to impart relatively rapid forward and backward movement to said member, connections whereby such movements are imparted from said elements to said member, and manually operated means adapted to operatively connect any one of said elements with said member and to determine the operative and inoperative relation of such element to said member.

2. In transmission mechanism for machine tools the combination with a reciprocatory member, of two feed elements adapted respectively to impart relatively slow forward and backward movement to said member, two quick traverse elements adapted respectively to impart relatively rapid forward and backward movement to said member, connections whereby such movements are imparted from said elements to said member, and manually operated means adapted to operatively connect any one of said elements with said member and to prevent simultaneous operative connection of both feed elements or both rapid traverse elements with said member.

3. In transmission mechanism for machine tools the combination with a reciprocatory member, of two feed elements adapted respectively to impart relatively slow movement to said member in opposite directions, two quick traverse elements adapted respectively to impart relatively rapid movement to said member in opposite directions, connections whereby such movements are imparted from said elements to said member, and manually operated means adapted to operatively connect any one of said elements with said member or simultaneously connect either feed element and the corresponding quick traverse element with said member but to prevent simultaneous connection of both feed elements or of both quick traverse elements with said member.

4. In transmission mechanism for machine tools the combination with a reciprocatory member, of two feed elements adapted respectively to impart relatively slow movement to said member in opposite directions, two quick traverse elements adapted respectively to impart relatively rapid movement to said member in opposite directions, connections whereby such movements are imparted from said elements to said member, and means comprising a handle for operatively connecting and disconnecting either element of a pair with said member, the direction of movement of the handle determining and indicating the resulting direction of movement of said member.

5. In transmission mechanism for machine tools the combination with a reciprocatory member, of two feed elements adapted respectively to impart relatively slow movement to said member in opposite directions, two quick traverse elements adapted respectively to impart relatively rapid movement to said member in opposite directions, connections whereby such movements are imparted from said elements to said member, means comprising a handle for connecting and disconnecting either feed element and said member, and means comprising a handle for connecting and disconnecting either quick traverse element and said member, the direction of movement of the handles determining and indicating the resulting direction of movement of said member.

6. In transmission mechanism for machine tools, the combination with a reciprocatory member, a feed transmission comprising two driving elements adapted respectively to impart relatively slow movement to said member in opposite directions, a quick traverse transmission comprising two driving elements adapted respectively to impart relatively rapid movement to said member in opposite directions, connections whereby such movements are imparted from said elements to said member, shifting devices adapted to operatively connect or to disconnect said member and any of said driving elements, and a trip on said member adapted to engage and automatically operate one of said shifting devices.

7. In transmission mechanism for machine tools the combination with a reciprocatory member, of a feed transmission comprising two driving elements adapted respectively to impart relatively slow movement to said member in opposite directions, a quick traverse transmission comprising two elements adapted respectively to impart relatively rapid movement to said member in opposite directions, connections whereby such movements are imparted from said elements to said member, shifting devices adapted to operatively connect and to disconnect said member and either of said feed elements or either of said quick traverse elements, means for manually operating said shifting devices and determining the operative or non-operative relation of said driving elements to said member, and a trip on said member adapted to engage and automatically operate one of said shifting devices.

8. In transmission mechanism for machine tools the combination with a reciprocatory member, of a feed transmission comprising two driving elements adapted respectively to impart relatively slow movement to said member in opposite directions, a quick traverse transmission comprising two elements adapted respectively to impart relatively rapid movement to said member in opposite directions, connections whereby such movements are imparted from said elements to said member, shifting devices adapted to operatively connect and to disconnect said member and either of said feed elements or either of said quick traverse elements, and means coacting with said shifting devices to automatically disconnect said member from either feed element when said member is operatively connected with the oppositely working rapid traverse element and vice versa, and permit simultaneous connection of said member with unidirectional feed and quick traverse elements.

9. In transmission mechanism for machine tools the combination with a reciprocatory member, of a feed transmission comprising two driving elements, adapted respectively to impart relatively slow movement to said member in opposite directions, a quick traverse transmission comprising two driving elements adapted respectively to impart relatively rapid movement to said member in opposite directions, connections whereby such movements are imparted from said elements to said member, shifting devices adapted to operatively connect and to disconnect said member and either of said feed elements or either of said quick traverse elements, means coacting with said shifting devices to automatically disconnect said member from either feed element when said member is operatively connected with the oppositely working rapid traverse element and vice versa and permit simultaneous connection of said member with unidirectional feed and quick traverse elements, an adjustable trip on said member adapted to coöperate with one of said shifting devices to operatively connect said member with one of said driving elements, and a stop on said member adapted to coöperate with said coacting means to disconnect said member from said driving element.

10. In transmission mechanism for machine tools the combination with a reciprocatory member, of a feed transmission comprising two driving elements adapted respectively to impart relatively slow movement to said member in opposite directions, a quick traverse transmission comprising two driving elements adapted respectively to impart relatively rapid movement to said member in opposite directions, connections whereby such movements are imparted from said elements to said member, shifting devices adapted to operatively connect and to disconnect said member and either of said feed elements or either of said quick traverse elements, and a number of trips mounted on said member and adapted to operate said shifting devices successively.

11. In transmission mechanism for machine tools the combination with a reciprocatory member of a feed transmission comprising two driving elements adapted to impart relatively slow movement to said member in opposite directions, a quick traverse transmission comprising two driving elements adapted to impart relatively rapid movement to said member in opposite directions, connections whereby such movements are imparted from said elements to said member, means for operatively connecting and disconnecting said member and any of said driving elements, and a yieldable coupling device in one of said transmissions.

12. In transmission mechanism for machine tools, the combination with a reciprocatory member, of a feed transmission comprising change-speed gearing, two driving elements adapted to impart relatively slow movement to said member in opposite directions and a yieldable coupling device between the change-speed gearing and said driving elements; and a quick traverse transmission comprising a power connection and two driving elements adapted to impart relatively rapid movement to said member in opposite directions; connections whereby such movements are imparted from said elements to said member, and means for operatively connecting any of said driving elements with said member.

13. In transmission mechanism for machine tools the combination with a reciprocatory member, of a feed transmission comprising a power connection, change-speed gearing, two driving elements adapted to impart relatively slow movement to said reciprocatory member in opposite directions, and a torque limiting device between said change-speed gearing and said elements, a quick traverse transmission comprising a power connection, two driving elements adapted to impart relatively rapid movement to said reciprocatory member in opposite directions, connections whereby such movements are imparted from said elements to said member, and a yieldable coupling device between said power connection and said quick traverse driving elements.

14. In transmission mechanism for machine tools the combination with a reciprocatory member, of a feed transmission comprising a shaft provided with two driving gears loosely mounted thereon. clutch mechanism for operatively connecting either of said gears with said shaft, a quick traverse transmission comprising a shaft provided with two driving gears loosely mounted thereon, clutch mechanism for operatively connecting either of said quick traverse gears with said shaft, and mechanism common to said four driving gears for imparting therefrom to said member, relatively slow movement or relatively rapid movement in opposite directions according to whichever of said gears is operatively connected with the shaft on which it is mounted.

15. In transmission mechanism for machine tools the combination of a reciprocatory member movable in courses transverse to each other, of a constant speed transmission, branch transmissions each comprising reversing mechanism for imparting movement to said member in opposite directions in each of said courses, and speed modifying gearing in one of the branch transmissions for actuating said member at a different rate of speed in one course from that in the other course.

16. In transmission mechanism for machine tools the combination with a reciprocatory member movable in courses transverse to each other, of a feed transmission comprising change-speed gearing, driving elements and reversing mechanism for imparting relatively slow variable movement to said member at the same rates of speed in opposite directions and in both courses; and a quick traverse transmission comprising driving elements and reversing mechanism for imparting relatively rapid movement to said member at the same rate of speed in each course but at different rates of speed in the two courses.

17. In transmission mechanism for machine tools the combination with a reciprocatory member movable in three courses transverse to one another, of a transmission shaft, reversing mechanism, a branch transmission driven from said shaft through said reversing mechanism and adapted to impart motion in opposite directions to said member in one of said courses, a second reversing mechanism, two branch transmissions each driven from said shaft through the second reversing mechanism for imparting motion in opposite directions to said member in each of the two other courses, and a clutch in each branch transmission for rendering it operative or inoperative.

18. In transmission mechanism for machine tools, the combination with a reciprocatory member movable in courses transverse to each other, of a transmission shaft, reversing mechanism, two branch transmissions driven from said shaft through said reversing mechanism for imparting motion to said member in opposite directions in each course, a reversing handle controlling said reversing mechanism and indicating by the direction of its movement the direction of movement of said member in either course, and a clutch in each branch transmission for rendering it operative or inoperative with respect to said member.

19. In transmission mechanism for machine tools the combination of a reciprocatory member movable in courses transverse to each other, of a feed transmission comprising two driving elements for imparting relatively slow movement to said member in opposite directions in each course, a quick traverse transmission comprising two driving elements for imparting relatively rapid movement to said member in opposite directions in each course, a branch transmission for each course, means for operatively connecting said branch transmissions with any of said four driving elements, and means for rendering either branch transmission operative or inoperative upon said member.

20. In transmission mechanism for machine tools the combination with a reciprocatory member, of a feed transmission adapted to impart relatively slow movement to said member, a quick traverse transmission adapted to impart relatively rapid movement to said member, a yieldable coupling device in one of said transmissions, shifting devices for operatively connecting and disconnecting said member and either of said transmissions, and trips on said member arranged and coöperating with said shifting devices to connect said member with one transmission before disconnecting it from the other.

21. In transmission mechanism for machine tools the combination with a reciprocatory member, of a feed transmission comprising a power connection, a yieldable coupling device and speed-change gearing between the power connection and the yieldable coupling device, for imparting relatively slow and variable movement to said member, a quick traverse transmission for imparting relatively rapid movement to said member at a constant speed, shifting devices for operatively connecting and disconnecting said member and either of said transmissions, and trips adjustably mounted on said member and coöperating with said shifting devices to connect said member with one transmission before disconnecting it from the other.

22. In transmission mechanism for machine tools the combination with a reciprocatory member, of a feed transmission comprising a power connection, a yieldable coupling device, and speed-change gearing between the power connection and the yieldable coupling device, a quick traverse transmission comprising a yieldable coupling device, shifting devices for operatively connecting and disconnecting said member and either of said transmissions, trips adjustably mounted on said member and coöperating therewith at predetermined points in its traverse to automatically connect said member with one transmission before disconnecting it from the other, and stops on said member coöperating with said shifting devices to automatically arrest its movement at the limits of its traverse.

23. In transmission mechanism for machine tools the combination with a reciprocatory member, of two elements for imparting movement to said member in opposite directions, a clutch device shiftable into engagement with either of said elements and into a neutral position out of engagement with both, and shifting mechanism comprising a spring-pressed plunger, a cam, and a lost motion connection, and adapted to hold the clutch device in either of its engaged positions or in its disengaged position and to shift it instantly past a position of slight engagement with either of said transmission elements.

24. In transmission mechanism for machine tools the combination with a reciprocatory member, of two elements for imparting movement to said member in opposite directions, a clutch device shiftable from a neutral position into engagement with either of said elements, shifting mechanism comprising a spring-pressed plunger, a cam, and a lost motion connection, and adapted to retain the clutch device in either of its engaged positions or in its neutral position and to instantly shift it in either direction past a position of slight engagement with either of said elements, and a part on said member coöperating with said shifting mechanism to impart initial movement to said clutch shifting mechanism.

25. In transmission mechanism for machine tools the combination with a reciprocatory member, of parallel feed and quick traverse transmission shafts, each provided with two gears loosely mounted thereon and meshing with corresponding gears on the other shaft, clutches for operatively connecting said gears with said shafts, means for shifting said clutches, and a branch transmission comprising reversing gearing adapted to impart relatively slow movement or relatively rapid movement in opposite directions to said member from said gears according to the positions of the clutches.

26. In transmission mechanism for machine tools the combination with a reciprocatory member, of parallel feed and quick traverse transmission shafts, two spur gears loosely mounted on each shaft and meshing with the corresponding gears on the other shaft, clutches for operatively connecting said gears with said shafts, and reversing and transmission mechanism adapted to impart movement from any one of said four gears to said reciprocatory member and comprising three intermeshing bevel gears one of which is connected with said member while the other two are attached to and rotate with the spur gears on one of said shafts.

27. In transmission mechanism for machine tools the combination with a reciprocatory member, of parallel feed and quick traverse shafts, two gears loosely mounted on each shaft and meshing with the two gears on the other shaft, reversing and transmission mechanism adapted to impart movement from said gears to said member at a relatively slow rate or at a relatively rapid rate in opposite directions, clutches feathered on said shafts and shiftable into and out of operative connection with said gears, clutch shifting devices, means for manually operating said shifting devices and means adjustably mounted on said member for automatically operating either of said shifting devices.

28. In transmission mechanism for machine tools the combination with a reciprocatory member, of parallel feed and quick traverse transmission shafts each provided with two driving gears meshing with the two gears on the other shaft, reversing and transmission mechanism connecting one pair of said gears with said member, a clutch for operatively connecting either of each pair of said driving gears with the shaft on which they are mounted, clutch shifting devices, a bar having lost motion connections with said shifting devices and stops on said reciprocatory member adapted by engagement with said bar to disconnect either clutch from either of the driving gears associated therewith and to automatically arrest said reciprocatory member at the limits of its traverse.

29. In transmission mechanism for machine tools the combination with a reciprocatory member, of parallel feed and quick traverse shafts each provided with two driving gears meshing with the two gears on the other shaft, reversing and transmission mechanism connecting one pair of said gears with said member, a clutch for operatively connecting either of each pair of gears with the shaft on which they are mounted, clutch shifting devices having lost motion connections, means for imparting initial movement to said shifting devices, and means comprising a cam and a spring actuated plunger coöperating therewith to retain each clutch in either of its engaged positions or in its neutral position and to complete its movement in either direction from neutral to either engaged position or vice versa.

30. In transmission mechanism for machine tools the combination with a reciprocatory member, of parallel feed and quick traverse shafts each provided with two driving gears meshing with corresponding gears on the other shaft, speed-change gearing, a yieldable coupling device connecting said gearing with the feed shaft, reversing and transmission mechanism connecting one pair of said driving gears with said reciprocatory member, and a clutch for operatively connecting either of each pair of driving gears with the shaft on which they are mounted.

31. In transmission mechanism for machine tools the combination of a reciprocatory member movable in courses transverse to each other, of parallel feed and quick transmission shafts each provided with two driving gears loosely mounted thereon and meshing with the two gears on the other shaft, a clutch for operatively connecting either of each pair of gears with the associated shaft, reversing and transmission mechanism comprising two axially connected gears, one meshing with one driving gear on one shaft and the other meshing with the distant driving gear on the other shaft, branch transmissions for imparting relatively slow and relatively rapid movement to said reciprocatory member in either of its courses from said reversing mechanism, and a clutch in each branch transmission for rendering the same operative or inoperative upon said member.

32. In transmission mechanism for machine tools the combination with a frame provided with reciprocatory members mounted one upon the other and movable transversely to each other, of parallel feed and quick traverse shafts mounted on and movable with one of said members and each provided with two loose driving gears meshing with the corresponding gears on the other shaft, clutches for operatively connecting either of each pair of driving gears with the shaft on which they are mounted, reversing and transmission mechanism for imparting movement from said driving gears to either of said members, clutch shifting levers, rocker shafts arranged transversely to the feed and quick traverse shafts and connected with said levers, a connecting bar arranged transversely to said rocker shafts and having lost motion connections therewith, a rack bar arranged transversely to the connecting bar and connected therewith, pinions mounted on one of said reciprocatory members in engagement with said rack bar, and provided with projections, and parts on the other reciprocatory member and on the frame adapted by engagement with said projections to shift the rack bar.

33. In transmission mechanism for machine tools the combination with a frame provided with reciprocatory members mounted one upon the other and movable transversely to each other, of parallel feed and quick traverse shafts mounted on and movable with one of said members and each provided with two loose driving gears meshing with the corresponding gears on the other shaft, clutches for operatively connecting either of each pair of gears with the shaft on which they are mounted, reversing and transmission mechanism for imparting movement from said driving gears to one of said members, clutch shifting levers, rocker shafts arranged transversely to the feed and quick traverse shafts and connected with said levers, a connecting bar arranged transversely to said rocker shafts and having lost motion connections therewith, a rack bar arranged transversely to the connecting bar and connected therewith, a pinion mounted on one of said reciprocatory members and provided with a projection, and a part on the other reciprocatory member adapted by engagement with said projection to shift the rack bar.

34. In transmission mechanism for machine tools, the combination with a frame provided with reciprocatory members mounted one upon the other and movable transversely to each other, of parallel feed and quick traverse shafts mounted on and movable with one of said members and each provided with two loose driving gears meshing with the corresponding gears on the other shaft, clutches for operatively connecting either of each pair of gears with the shaft on which they are mounted, reversing and transmission mechanism for imparting movement from said driving gears to one of said members, clutch shifting levers, rocker shafts arranged transversely to the feed and quick traverse shafts and connected with said levers, a connecting bar arranged transversely to said rocker shafts and having lost motion connections therewith, a rack bar arranged transversely to the connecting bar and connected therewith, a pinion mounted on one of said reciprocatory members and provided with a projection, and a part on the frame in the path of said projection adapted by engagement therewith to shift the rack bar.

35. In transmission mechanism for machine tools, the combination with a frame provided with reciprocatory members mounted one upon the other and movable transversely to each other, of parallel feed and quick traverse shafts mounted on and movable with one of said members and each provided with two loose driving gears meshing with the corresponding gears on the other shaft, clutches for operatively connecting either of each pair of driving gears with the shaft on which they are mounted, reversing and transmission mechanism for imparting movement from said driving gears to either of said members, clutch shifting levers, rocker shafts arranged transversely to the feed and quick traverse shafts and connected with said levers, a connecting bar arranged transversely to said rocker shafts and having lost motion connections therewith, a rack bar arranged transversely to the connecting bar and connected therewith, pinions mounted on one of said reciprocatory members in engagement with said rack bar and provided with projections, and parts adjustably mounted on the other reciprocatory member and on the frame and adapted by engagement with said projections to shift the rack bar at any desired point in the traverse of either reciprocatory member.

36. In transmission mechanism for machine tools the combination with a frame provided with reciprocatory members mounted one upon the other and movable transversely to each other, of parallel feed and quick traverse shafts mounted on and movable with one of said members and each provided with two loose driving gears meshing with the corresponding gears on the other shaft, clutches for operatively connecting either of each pair of gears with the shaft on which they are mounted, reversing and transmission mechanism for imparting movement from said driving gears to one of said members, clutch shifting levers, rocker shafts arranged transversely to the feed and quick traverse shafts and connected with said levers, a connecting bar arranged transversely to said rocker shaft and having lost motion connections therewith, a rack bar arranged transversely to the connecting bar and connected therewith, a pinion mounted on one of said reciprocatory members and provided with a projection, and parts fixed on the other reciprocatory member and adapted by engagement with said projection to shift the rack bar and arrest the movement of said member at the limits of its traverse.

37. In transmission mechanism for machine tools the combination with a frame provided with reciprocatory members mounted one upon the other and movable transversely to each other, of parallel feed and quick traverse shafts mounted on and movable with one of said members and each provided with two loose driving gears meshing with the corresponding gears on the other shaft, clutches for operatively connecting either of each pair of gears with the shaft on which they are mounted, reversing and transmission mechanism for imparting movement from said driving gears to one of said members, clutch shifting levers, rocker shafts arranged transversely to the feed and quick traverse shafts and connected with said levers, a connecting bar arranged transversely to said rocker shaft and having lost motion connections therewith, a rack bar arranged transversely to the connecting bar and connected therewith, a pinion mounted on one of said reciprocatory members and provided with a projection, and parts fixed on the frame in the path of said projection and adapted by engagement therewith to arrest the movement of said member at the limits of its traverse.

38. In transmission mechanism for machine tools the combination with a frame provided with reciprocatory members mounted thereon and on one another and movable in courses transverse to one another, of parallel feed and quick traverse shafts mounted on and movable with one of said members and each provided with two loose driving gears meshing with corresponding gears on the other shaft, clutches feathered on said shafts for operatively connecting either of each pair of gears with the shaft on which they are mounted, said gears and clutches being bodily shiftable lengthwise of said shafts, reversing and branch transmission gearing for imparting movement to one of said members from said driving gears, another pair of driving gears loosely mounted on each of said shafts and meshing with corresponding gears on the other shaft, clutches for operatively connecting either of each pair of said gears with the shaft on which they are mounted, reversing gearing and branch transmissions for imparting movement from any of the last mentioned driving gears to either of the other two reciprocatory members, and a clutch in each branch transmission for rendering the same operative or inoperative.

39. In transmission mechanism for machine tools the combination with a frame, a vertically movable knee mounted thereon, a horizontally movable saddle mounted on said knee, and a table mounted on the saddle and movable transversely thereto, of feed and quick traverse transmissions comprising two primary parallel shafts mounted on said frame, change-speed gearing for imparting a relatively slow variable movement to the feed shaft, two secondary parallel shafts mounted on and movable with the knee and connected by universally jointed telescopic shafts with the primary shafts, two sets of driving gears, each set comprising two gears mounted on each shaft and meshing with corresponding gears on the other shaft, clutches for operatively connecting either of each pair of gears with the shaft on which they are mounted, one set of gears and clutches being connected and movable with the saddle and shiftable therewith lengthwise of the secondary shafts, a branch transmission including reversing gearing for connecting either of each pair of said shiftable gears with the table and imparting thereto relatively slow and variable movement or relatively rapid movement in opposite directions, two branch transmissions including reversing gearing common to both for connecting either of each pair of the other set of driving gears with the saddle or knee and imparting thereto relatively slow variable movement or relatively rapid movement in opposite directions, and a clutch in each branch transmission for rendering the same operative or inoperative.

40. In transmission mechanism for machine tools, the combination with a frame and a tool spindle and a reciprocatory member mounted thereon, of a main driving member, a transmission for rotating the spindle from said driving member, a feed transmission connected with the spindle transmission for imparting relatively slow movement to said reciprocatory member, a quick traverse transmission having an independent connection with said driving member for imparting relatively rapid movement to said reciprocatory member, and means for connecting and disconnecting the spindle transmission and said driving member, whereby the reciprocatory member is operated by the feed transmission only when the tool spindle is rotated, but may be operated by the quick traverse transmission when the tool spindle is at rest.

41. In transmission mechanism for machine tools, the combination with a rotary tool spindle and a reciprocatory member, of a main driving member, a spindle transmission, a feed transmission for imparting relatively slow movement to said reciprocatory member, a clutch controlling the connection of both of said transmissions with said driving member, a quick traverse transmission including clutch controlled reversing mechanism for imparting relatively rapid movement to said reciprocatory member in opposite directions, and a separate clutch controlling operative connection between the reversing mechanism of the quick traverse transmission and said driving member.

42. In transmission mechanism for machine tools, the combination with a rotary tool spindle and a reciprocatory member, of a main driving member, a transmission for rotating the spindle, a feed transmission including a universally jointed telescopic shaft for imparting relatively slow movement from the driving member to the reciprocatory member, a clutch controlling the operative connection of both of said transmissions with the driving member, a quick traverse transmission, including clutch controlled reversing mechanism and a universally jointed telescopic shaft, for imparting relatively rapid movement from said driving member to the reciprocatory member in opposite directions, and a separate clutch controlling operative connection between the reversing mechanism of the quick traverse transmission and the driving member.

43. In transmission mechanism for machine tools the combination with a rotary tool spindle and a reciprocatory member, of a main driving member, a transmission comprising speed-change gearing and clutch controlled reversing mechanism for rotating the spindle at different speeds in either direction from said driving member, a feed transmission comprising speed-change gearing and clutch controlled reversing mechanism for imparting relatively slow variable movement from said driving member to said reciprocatory member in opposite directions, a clutch controlling operative connection of both of said transmissions with said driving member, a quick traverse transmission comprising clutch controlled reversing mechanism for imparting relatively rapid movement at a constant speed from said driving member to said reciprocatory member in opposite directions, and a separate clutch controlling operative connection between the reversing mechanism of the quick traverse transmission and said driving member.

In witness whereof I hereto affix my signature.

FRED A. PARSONS.